Patented Sept. 12, 1922.

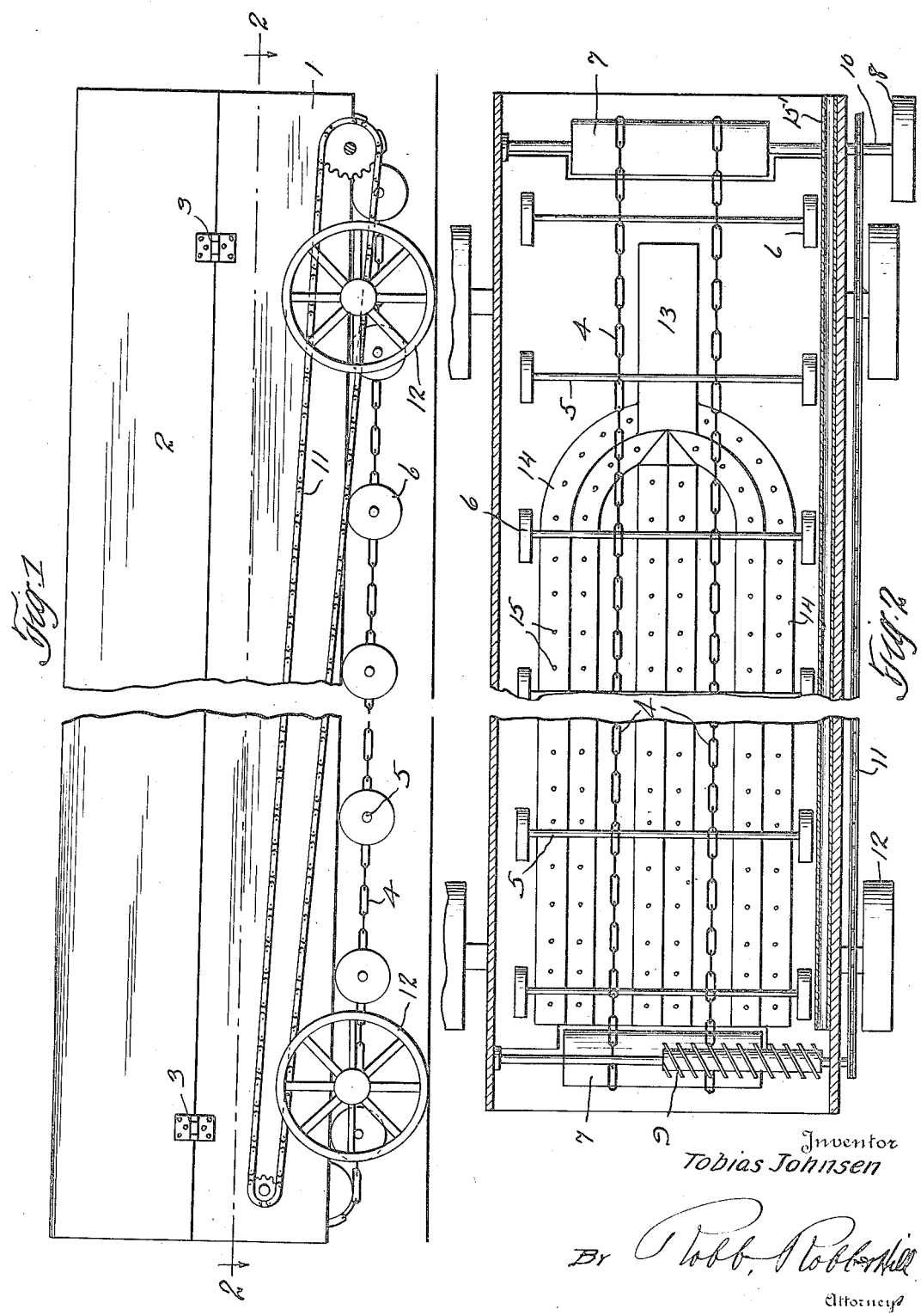

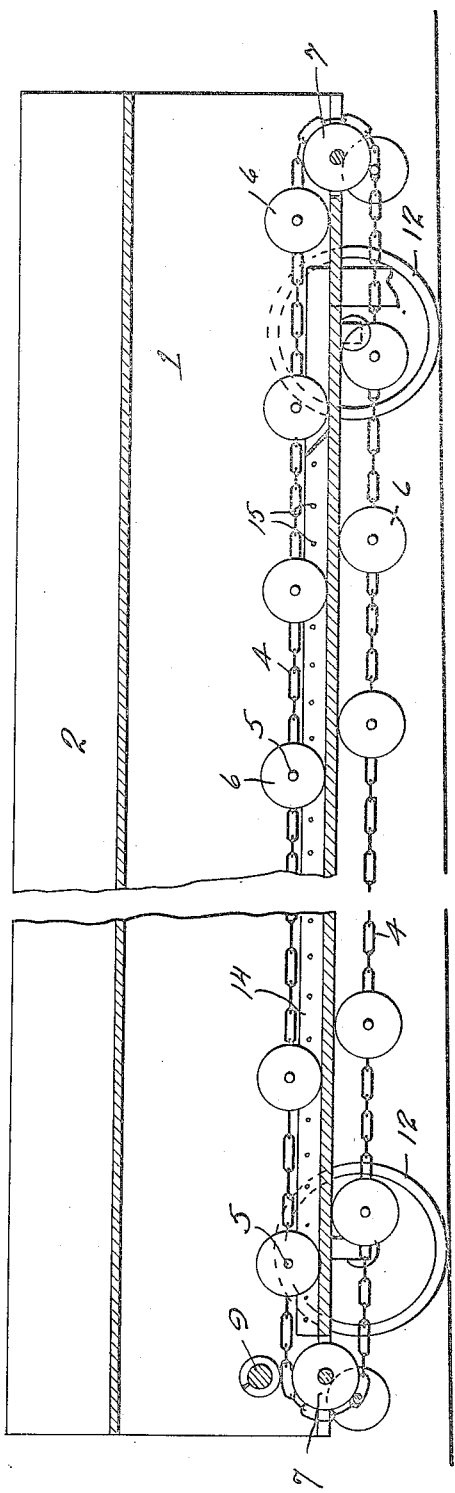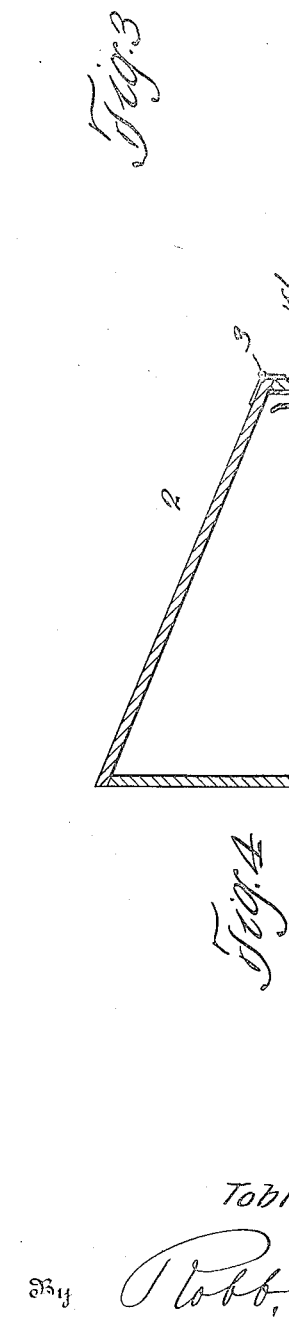

1,428,593

UNITED STATES PATENT OFFICE.

TOBIAS JOHNSEN, OF NORTH BAY, ONTARIO, CANADA.

PORTABLE DRYING APPARATUS.

Application filed February 7, 1920. Serial No. 357,082.

*To all whom it may concern:*

Be it known that I, TOBIAS JOHNSEN, a subject of the King of Great Britain, residing at North Bay, Province of Ontario, Dominion of Canada, have invented certain new and useful Improvements in Portable Drying Apparatus, of which the following is a specification.

The object of the present invention is to provide a simple, portable drying apparatus, designed to facilitate the process of curing and saving of certain crops, such as hay and grain. To this end I employ a casing or chamber through which the grain is slowly carried by a conveyer and during its passage said grain or other material is subjected to heated air, whereby the work may be carried on regardless of unfavorable weather conditions or moisture.

Among others an important feature of my apparatus resides in the construction of the chamber in such a manner that the moisture produced by condensation upon the walls of the chamber will collect in means provided to receive and convey the same from the apparatus.

These and such other objects as may hereinafter appear are attained by the novel construction, combination and arrangement of parts to be hereinafter specifically described and claimed. Reference will now be had to the accompanying drawings forming a part of this specification, wherein:

Figure 1 is a side elevation of an apparatus constructed in accordance with my invention.

Figure 2 is a horizontal section view on the line 2—2 of Figure 1.

Figure 3 is a longitudinal sectional view, and

Figure 4 is a transverse sectional view.

Throughout the following detail description and on the several figures of the drawings, similar parts are referred to by like reference characters.

Referring to the drawings, the preferred embodiment of my invention consists of a casing 1 preferably of considerable length and of metal material but the size and configuration of the casing or chamber 1 is subject to modification according to requirements. The casing is provided with a cover 2 hingedly connected to the lower of the sides of the casing, as at 3. An endless carrier 4 which consists of spaced chains connected to transverse rods 5 provided at either end with suitable rollers 6, operates about the drums 7 disposed at opposite ends of the casing. The carrier is driven from a suitable source of power through the drive pulley 8 and in order to enable the apparatus to be utilized in drying of grain that is tied in bundles, I preferably mount at one end that is the feeding end, of the casing a suitable material loosening device such as the band cutter 9 which is driven from the pulley shaft 10 by means of the chain 11. It should be understood that a special feeder and cutter device may be arranged at the end of the casing for the purpose of introducing the material into the casing but it is not intended that this feeding mechanism shall be a distinct part of the portable apparatus illustrated, unless it is so desired. The casing being mounted upon wheels 12 enables the apparatus to be moved from place to place into position to properly cooperate with other machinery when required. That is to say in the drying of grain, for instance wheat, the apparatus would be moved into position at the end of the threshing machine so as to receive the grain and deliver it to the mouth of said thresher, into which it would pass in proper condition for being threshed.

The apparatus is provided upon its bottom, interiorly of the casing with a conduit 13 into which heated air is admitted from any suitable source, under pressure, the air being conveyed by the branch conduits 14, any suitable member of which may be provided throughout the length of the casing. I have illustrated these conduits 14 to be triangular in cross section and provided with suitable apertures 15 arranged in spaced relation through which the heated air passes as the grain is carried over these conduits by the carrier 4. In this manner the material which is free or loose will be dried by the time it emerges from the discharge end of the casing.

It will be observed that the cover of the casing, or the top thereof, inclines to one side, and the object of this is to direct the condensed vapor or moisture which lodges upon the surface towards the side of the casing which is provided with an elongated receptacle or trough $15^1$. By means of this trough the moisture is conveyed from the casing and this will very materially assist in the prevention of rust or collection of moisture within the apparatus, as will be apparent to one skilled in the art to which this invention refers. Of course, it should be understood that the casing may be made of a different shape and more than one of the said troughs 15 provided to receive the condensation. I preferably provide for a slight inclination of the bottom of the casing, toward the discharge end so that the moisture or water will flow easily in that direction.

It will be observed that with an apparatus of this type hay may be easily cured and put away substantially as soon as it has been cut, or if the hay has been subjected to inclement weather, the saving process need not be delayed, owing to the facility with which the moisture may be extracted by the use of this apparatus. The invention, however, has other uses which will be apparent and need not be specifically mentioned herein.

Having thus described my invention, what I claim as new is:

1. A portable drying apparatus of the class described comprising a chamber or housing of elongated form mounted upon wheels, a conveyer operating from end to end of the casing, means at one end thereof for acting upon the material to loosen the same, means beneath the casing and conveyer for introducing heated air into the casing and through the material, and means for actuating said conveyer.

2. A portable drying apparatus of the class described comprising a chamber of elongated form, a carrier operable through said chamber, air conducting means arranged beneath the carrier and having escape openings to permit the heated air to pass out of the conducting means into the chamber and through the material on the conveyer, and moisture receiving means arranged within the casing the walls of which are formed to direct the moisture thereinto, and means for actuating the carrier.

3. A portable drying apparatus of the class described comprising a chamber of elongated form, an endless carrier operable through the chamber including supporting bars and rollers mounted thereupon, air conduits disposed upon the bottom of the chamber beneath the carrier and having a plurality of escape openings, a trough arranged at one side of the chamber to receive the moisture from the walls thereof and to direct the moisture from the apparatus, and means for acting upon the material to loosen same as it is fed into the receiving end of the chamber.

In testimony whereof I affix my signature.

TOBIAS JOHNSEN.